(12) United States Patent
Ek

(10) Patent No.: US 8,607,961 B2
(45) Date of Patent: Dec. 17, 2013

(54) LOCATING STATION

(75) Inventor: Anders Ek, Kullavik (SE)

(73) Assignee: FlexLink Components AB (SE)

( * ) Notice: Subject to any disclaimer, the term of this patent is extended or adjusted under 35 U.S.C. 154(b) by 125 days.

(21) Appl. No.: 12/725,807

(22) Filed: Mar. 17, 2010

(65) Prior Publication Data

US 2011/0226584 A1 Sep. 22, 2011

(51) Int. Cl.
*B65G 47/88* (2006.01)
*B65G 43/08* (2006.01)
*B65G 47/82* (2006.01)

(52) U.S. Cl.
USPC .................. 198/397.04; 198/340; 198/346.2; 198/341.07; 198/346

(58) Field of Classification Search
None
See application file for complete search history.

(56) References Cited

U.S. PATENT DOCUMENTS

| 5,966,309 | A | * | 10/1999 | O'Bryan et al. | ............... | 700/225 |
| 6,176,369 | B1 | * | 1/2001 | Petrovic | ................... | 198/867.11 |
| 6,520,313 | B1 | | 2/2003 | Kaarakainen et al. | | |
| 6,971,506 | B2 | * | 12/2005 | Hassinen et al. | ......... | 198/803.14 |
| 2005/0284735 | A1 | * | 12/2005 | Hartness et al. | .............. | 198/850 |

* cited by examiner

*Primary Examiner* — Kavel Singh
(74) *Attorney, Agent, or Firm* — Schwegman Lundberg & Woessner, P.A.

(57) ABSTRACT

Various embodiments include a locating device for holding a puck in a locating position in a conveyer system, comprising a base portion, a rail section, and a rotating disc rotatable supported in the base portion and having a puck recess, where the locating device comprises a locating position between the puck recess of the rotating disc and a positioning means in the rail section, and that the locating device comprises resilient means adapted to hold a puck in the locating position.

18 Claims, 3 Drawing Sheets

LOCATING STATION

TECHNICAL FIELD

The present invention relates to a locating device for a conveyor system.

BACKGROUND

Conveying devices, such as those which are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via carrying means, which are also known as pallets. A specific type of pallet is a puck, which is a round carrier adapted for smaller and more lightweight objects.

A pallet is conveyed along the conveying device, which comprises different work stations. At a work station, the pallet will be stopped such that the operation may be performed on the transported object. In some cases, the object may pass a specific work station without an operation being performed on the object.

If the conveying device is of a conventional type, in which all work stations are positioned after each other and the operations on the objects are performed synchronous, every pallet will stop at each work station. If no operation is to be performed on an object at a specific work station, the object will have to wait at that work station until the operation on the previous object at that work station is ready, until the object can continue. All pallets are in this case released at the same time and moves at the same time. One advantage of such a system is that it is easy to predict the performance of the system. One disadvantage of such a system is that it is not very flexible. If the operation time at a work station is long, all objects will have to wait that time, even if there is no operation performed on all objects. Thus, such systems are mostly used for a single product or when the differences in the products are small.

In other systems, the operations on the objects are performed asynchronous, i.e. the pallet stops at a work station where an operation is to be performed, and is released when the operation is ready. In such systems, a relatively large buffer is required between each work station in order to compensate for the different through-flow times of the products and for the different operation times at a work station.

Another way of compensating for different operation times at a work station is to use two or more work stations that perform the same task. They are often positioned close to each other, and the object is stopped at the work station that is free. In this way, the through-flow time of the system can be balanced in order to avoid bottlenecks in the system. In such a system, the pallet may either be stopped at the work station or may pass the work station without an operation being performed.

In very simple systems, it may be enough to stop the pallet on the conveyor device and hold it there with a simple stop mechanism. This is enough if a simple operation such as loading or unloading is to be performed. For more advanced operations, the pallet and/or work piece is normally deviated from the main conveyor track into a position beside the conveyor track. In this way, the operation can be performed on the work piece without influence from the conveyor track, which continues to move.

The work station may be positioned at a sub-conveyor located on the side of the main conveyor. Such a solution will require extra space, an extra sub-conveyor, and means to divert objects to the sub-conveyor. This solution will work well in some cases, but is rather inflexible and complicated for smaller operations.

When the pallet is stopped at the work station, it is important that the pallet is held in a specific, predefined position in order for the work station to perform the operation. If the locating accuracy of the work station is not good enough, the work piece may be damaged or the operation may not be as good as expected. In order to obtain a repeatable positioning of the pallet and/or the work piece, the working station is normally equipped with a specific fixating means that holds the work piece during the operation.

Such fixating means are often provided with a number of sensors in order to establish the position of the pallet and/or the work piece before it reaches the stop and specific holding means operated in dependency of the sensors in order to hold the work piece. Such a solution may in some cases be more complicated than necessary. There is thus room for improvements.

DISCLOSURE OF INVENTION

An object of the invention is therefore to provide a locating device for a conveyor system.

A further object of the invention is to provide a locating device that can both divert a puck and hold it in a specific position. Another object of the invention is to provide a conveyor system comprising a locating device.

The solution to the problem according to the invention is described in the characterizing part of claim 1. Claim 11 contains an advantageous conveyor system. The other claims contain advantageous embodiments and further developments of the locating device.

In a locating device for holding a puck in a locating position in a conveyer system, comprising a base portion, a rail section and a rotating disc rotatable supported in the base portion and having a puck recess, the object of the invention is achieved in that the locating device comprises a locating position between the puck recess of the rotating disc and a positioning means in the rail section, and that the locating device comprises resilient means adapted to hold a puck in the locating position.

By this first embodiment of the locating device according to the invention, a locating device that can divert a puck to a predefined position on the side of a conveyor track and that can hold the puck in this position is provided. With such a locating device, the rotating disc will first divert the puck from the conveyor track to a locating position next to the conveyor track and will then hold the puck in this fixed, predefined locating position during the operation being performed on the work piece of the puck. In this way, there is no need for external conveying means that transports the puck to the locating position and not for external holding means that hold the puck in this position. In this way, a simple and cost-effective locating device is obtained. The locating device does not, apart from the rotating disc, comprise any moving parts that need maintenance.

The inventive locating device holds the puck in the locating position by means of one or more resilient elements. The resilient elements may be either different type of springs, e.g. steel springs, or elastomer elements. The resilient element may be provided either in the rotating disc or at the positioning means provided in the rail. The resilient element will press the puck towards position defining elements. In this way, the repeatability of the locating position will be very high.

In one embodiment, the resilient element is provided in the rotating disc. The position defining elements are provided in the positioning means mounted in the rail. In this embodiment, the position defining elements are fixed. This solution provides a high repeatability of the locating position that is independent of the accuracy of the rotating disc. In this way, a relatively cheap decoder can be used for the rotating disc, since a deviation of the stop position of the rotating disc will not affect the locating position. Depending on the design of the rotating disc, a deviation of several degrees for the stop position of the rotating disc may be allowed.

In a second embodiment, the resilient element is provided in the positioning means in the rail. The position defining elements are here provided in the puck recess of the rotating disc. In this embodiment, the repeatability of the locating position is dependent of the accuracy of the rotating disc. Depending on the required repeatability for the locating position, a suitable rotational decoder is selected for the rotating disc. An accuracy for the stop position of the rotating disc that is in the region between one to one tenth of a degree is plausible.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
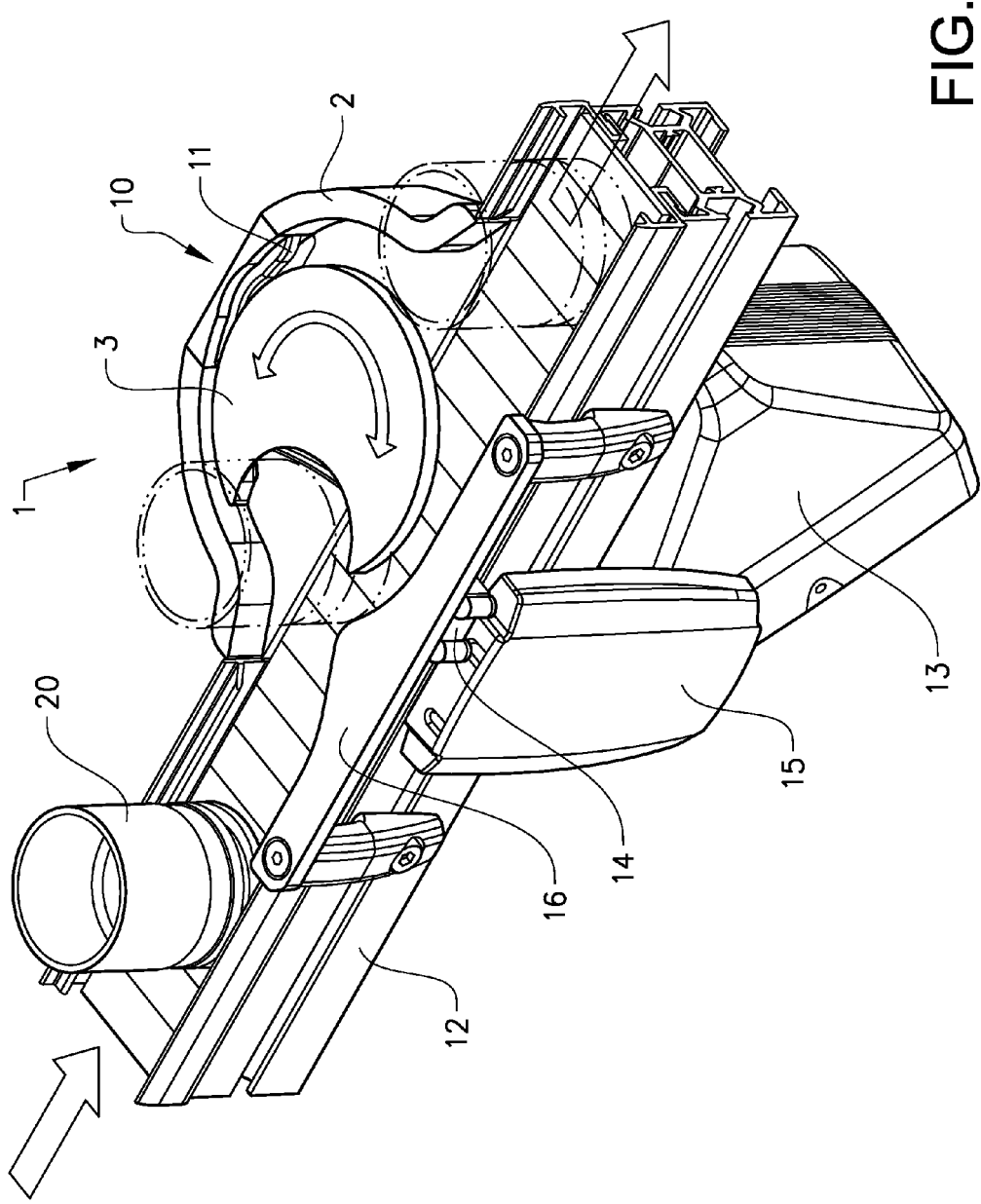
FIG. 1 shows a locating unit according to the invention.
Figure 2:
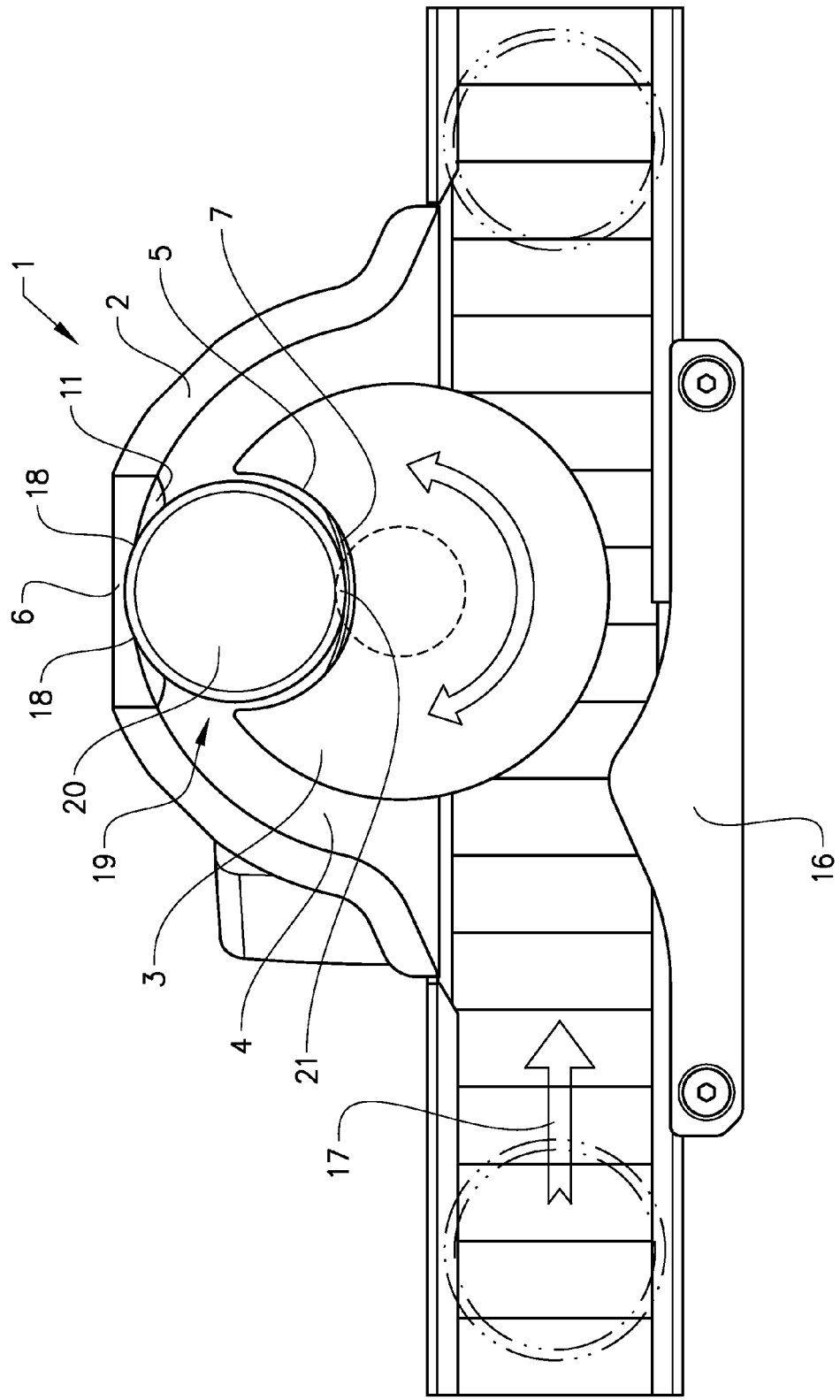
FIG. 2 shows a first embodiment of the locating device according to the invention.

FIG. 1 shows a locating unit 10 for a conveyor system according to the invention, and FIG. 2 shows a first embodiment of a locating device 1 for use in the locating unit. The locating unit 10 comprises in this example a locating device 1, a conveyor beam 12, a motor 13, a position sensor 14, a RFID read/write head 15 and a steering rail 16. The locating unit 10 is adapted to handle pucks 20 that hold a work piece, such as a test tube, a small bottle or other containers.

The locating unit is adapted to be mounted in a conveyor system. The conveyor beam will be connected to other conveyor beams and a conveyor chain will be mounted to the beam such that an endless conveyor track is obtained. The motor will rotate the rotating disc when a puck arrives at the rotating unit. The motor may either be independent, controlled only by a sensor in the locating unit, or may be connected to the control system of the complete conveyor system. The sensor 14 detects when a puck arrives in the puck recess of the rotating disc. The sensor may control the motor directly or may send a signal to the control system. The RFID read/write head can detect RFID tags provided in the pucks, such that each puck may be identified and/or that specific data may be stored in the RFID. Conveyor systems are well known and are not described in more detail.

The locating device 1 shown in FIGS. 1 and 2 comprises a base portion 4 that is adapted to be mounted to a conveyor beam. When the base portion is mounted to a conveyor beam comprising a conveyor chain, the height of the upper surface of the base portion will correspond to the height of the conveyor chain such that a puck can be diverted from the conveyor chain to the locating position 19 on the base portion without problems. The locating position 19 is the position in which the puck 20 is to be held during an operation on the work piece of the puck. The locating device further comprises a curved rail 2 that will prevent the puck from falling of the locating device when it is diverted from the conveyor chain. The puck is diverted by a rotating disc 3 comprising a puck recess 5 that corresponds to the size of the puck. When a puck reaches the locating device, the rotating disc may be positioned in an idle position in which the puck enters into the puck recess.

A sensor detects that the puck is in position in the puck recess and the motor rotates the rotating disc with the puck. In FIG. 1, the rotating disc is shown in the idle position. In FIG. 2, the rotating disc is shown with a puck in the locating position 19. In the shown example, the conveyor track moves in the direction of arrow 17. The rotating disc will in this example rotate in the clockwise direction in order to bring the puck to the locating position. Alternatively, if the puck is not to be brought to the locating position, the rotating disc may rotate in the counter-clockwise direction in order to let the puck pass through the locating device. The puck will then bear against the steering rail 16 until it is released on the conveyor track.

When the puck is to be positioned in the locating position, the rotating disc rotates until the puck is positioned in the locating position. This position is predefined and the detector of the motor is calibrated such that the rotating disc stops at this position. In order to hold the puck in the locating position, a positioning means 6 is provided in the rail. The positioning means comprises position defining elements 18 against which the puck bears. In the shown example, the position defining elements are the two sides of a V-shaped block, but other types of position defining elements are also possible. The positioning means is fixed to the locating device which means that the position repeatability of the locating position will be very good. The rotating disc is provided with a resilient means that pushes the puck against the positioning means. In this way, each puck will obtain the same position in the locating device every time, regardless of the accuracy of the stop position of the rotating disc. The stop position of the rotating disc may thus deviate some without affecting the repeatability of the puck position.

The resilient means in the rotating disc is in the shown example a continuous leaf spring made of steel. It is also possible to use other shapes of the leaf spring, to use two leaf springs or to use other types of springs. It is also possible to use elastomer elements as the resilient means. The resilient means must not stop the puck from entering the puck recess but must be able to press the puck against the positioning means. The force of the resilient means depend e.g. the rotation torque of the motor.

When the puck is in the locating position, an operation can be performed on the work piece in the puck. Such an operation may include filling a test tube, extracting a sample from a test tube, filling a medicine bottle, inserting or removing a test tube. Since the puck is held in position by the resilient means, no loads should be applied to the work piece in the plane of the conveyor track. A load in the downwards vertical direction may be allowed. By providing the positioning means with a position flange 11 that corresponds to a groove in the base of the puck, also loads in the upwards vertical direction may be allowed. The rotating wheel 3 may also be provided with a position wheel 21, shown as a dashed line in FIG. 2. The position wheel will also correspond to a groove in the base of the puck, and will also help to take forces in the upwards vertical direction. It is also possible to provide the puck recess of the rotating disc with a flange that corresponds to a groove in the base of the puck in order to increase the load capacity in the upwards vertical direction.

When the operation on the work piece is completed, the rotating disc continues to rotate in the clockwise direction until the puck is in the release position, where it continuous on the conveyor track to the next station. The rotating disc will then rotate back to the idle position in order to pick up the next puck. Since the rotating disc only has one puck recess, there is no need for an extra stop function in the locating device, since no other puck can enter into the locating device. The locating device will thus also provide a queuing function, in which the locating device may queue up pucks and let them pass through the locating device when the system so requires.

One advantage of the locating device is that all pucks do not have to pass the locating position of the locating device. This allows the conveyor system to be scaled up in order to increase the capacity of the system. By placing two locating devices after each other on the conveyor track, the first locating device can pass every second puck through to the second locating device, and drive every other to the locating position of the first locating device for an operation. The second locating device will pass through the puck that has been at the first locating position.

Figure 3A:
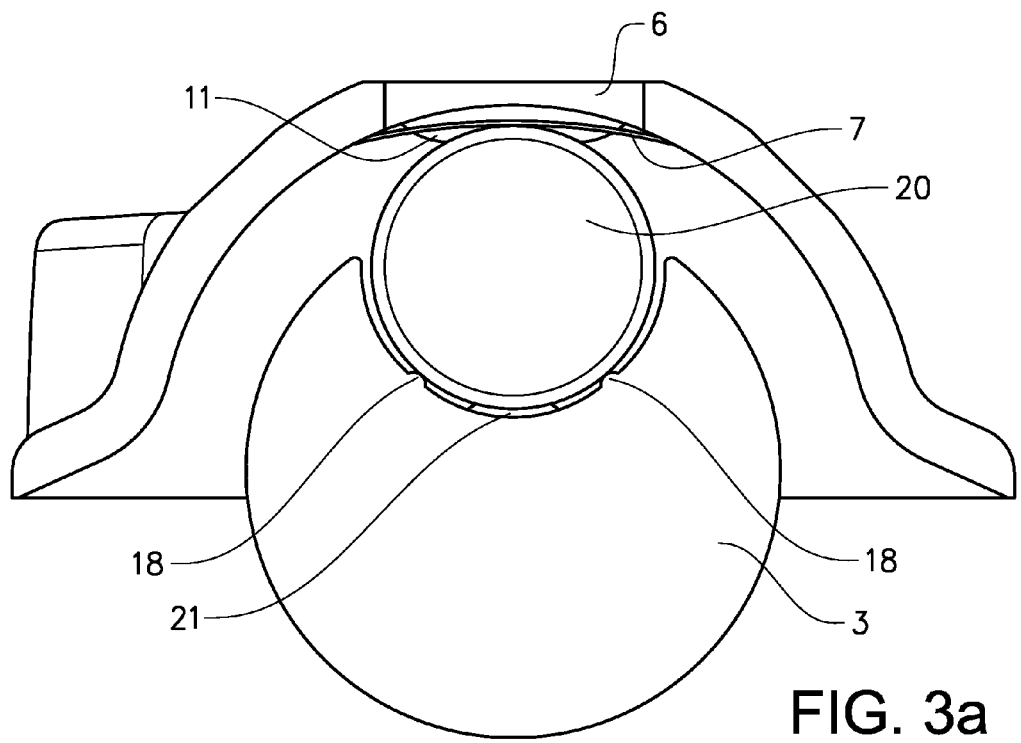
FIG. 3a shows an example of a second embodiment of the locating device according to the invention.

In a second embodiment of the locating device, shown in FIG. 3a, the positioning means is provided with a resilient means 7 that pushes the puck against the inner surface of the puck recess of the rotating disc. In order to improve to repeatability of the locating position, it is possible to provide the puck recess with position defining elements 18. The position defining elements are preferably two protrusions on the inner surface of the puck recess, such that a well defined locating position is obtained when the puck bear on the position defining elements. In this embodiment, the accuracy of the stop position of the rotating disc is more important than in the first embodiment and will define the repeatability of the locating position. Depending on the operation that is to be performed on the work piece, the accuracy of the stop position can be selected accordingly.

Figure 3B:
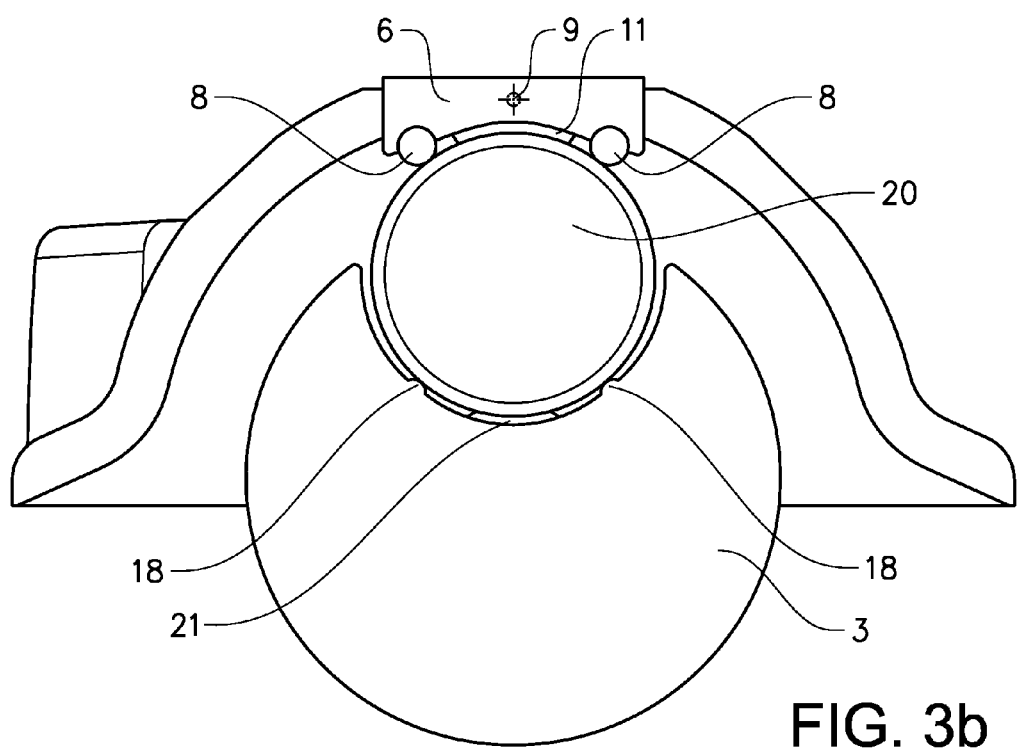
FIG. 3b shows another example of a second embodiment of the locating device according to the invention.

The resilient means in the positioning means may also be a continuous leaf spring made of steel. It is also possible to use other shapes of the leaf spring, to use two leaf springs or to use other types of springs. It is also possible to use elastomer elements as the resilient means. The resilient means must allow the puck to enter into the locating position and must also press the puck against the position defining elements. The force of the resilient means depend e.g. the rotation torque of the motor. In another example, as shown in FIG. 3b, the positioning means also comprises two roller elements 8 that allow the puck to enter into the locating position with less friction. The positioning means is here suspended on an axis 9 such that the positioning means can rotate somewhat around the axis in order to allow the puck to enter into the locating position. The axis of the positioning means is also spring-loaded, but it is also possible to spring-load each rotating element. In this way, the puck can enter into the locating position with less force.

The invention is not to be regarded as being limited to the embodiments described above, a number of additional variants and modifications being possible within the scope of the subsequent patent claims.

REFERENCE SIGNS

1: Locating device
2: Curved rail
3: Rotating disc
4: Base portion
5: Puck recess
6: Positioning means
7: Spring
8: Roller element
9: Axis
10: Locating unit
11: Position flange
12: Conveyor beam
13: Motor
14: Sensor
15: RFID head
16: Steering rail
17: Moving direction
18: Position defining element
19: Locating position
20: Puck
21: Position wheel

What is claimed is:

1. An apparatus comprising:
a locating device for holding a puck in a fixed and predefined locating position in a conveyer system, the locating device including,
a base portion,
a rail section including a positioning means in the rail, and
a rotating disc rotatably supported in the base portion and having a puck recess, the puck recess operable to receive the puck while the rotating disc is in an idle position, and to rotate so that the puck recess brings the puck into the fixed and predefined locating position, and to hold the puck at the fixed and predefined locating position,
wherein the locating device comprises resilient means adapted to push the puck towards the fixed and predefined locating position once the puck is brought to the fixed and predefined locating position.

2. The apparatus according to claim 1, wherein the resilient means is one or more leaf springs.

3. The apparatus according to claim 1, wherein the resilient means is one or more elastomer elements made from rubber or plastic.

4. The apparatus according claim 1, wherein the resilient means is provided in the puck recess of the rotating disc.

5. The apparatus according to claim 1, wherein the resilient means is provided on the positioning means.

6. The apparatus according to claim 5, wherein the positioning means further comprises two rotational elements.

7. The apparatus according to claim 5, wherein the positioning means is rotatable suspended on an axis.

8. The apparatus according to claim 5, wherein the positioning means is suspended by the resilient means.

9. The apparatus according to claim 8, wherein the positioning means further comprises two rotational elements.

10. The apparatus according to claim 8, wherein the positioning means is rotatable suspended on an axis.

11. The apparatus according to claim 1, wherein the device is mounted to a portion of a conveyor beam such that is makes up a locating unit that can be inserted in a conveyor track in an existing conveyor system.

12. The apparatus according to claim 11, further comprising:
a photoelectric sensor adapted to detect the presence of a puck in the puck recess.

13. The apparatus according claim 11, further comprising:
a RFID read/write unit adapted to identify a puck equipped with a RFID tag.

14. A conveyor system comprising:
a conveyor beam;
a locating device mounted to the conveyor beam, the locating device for holding a puck in a fixed and predefined locating position in the conveyer system, the locating device including
 a base portion,
 a rail section including a positioning means in the rail, and
 a rotating disc rotatably supported in the base portion and having a puck recess, the puck recess operable to receive the puck while the rotating disc is in an idle position, and to rotate so that the puck recess brings the puck into the fixed and predefined locating position, and to hold the puck at the fixed and predefined locating position,
wherein the locating device comprises resilient means adapted to push the puck towards the fixed and predefined locating position once the puck is brought to the fixed and predefined locating position.

15. The conveyor system according to claim 14, wherein the resilient means is one or more leaf springs.

16. The conveyor system according to claim 14, wherein the resilient means is one or more elastomer elements made from rubber or plastic.

17. The conveyor system according claim 14, wherein the resilient means is provided in the puck recess of the rotating disc.

18. The conveyor system according to claim 14, wherein the resilient means is provided on the positioning means.

* * * * *